Nov. 22, 1966 C. A. VOGEL 3,286,538
ROTATING DRIVE SYSTEM MEMBER
Filed Sept. 21, 1964 4 Sheets-Sheet 1

CHARLES A. VOGEL
INVENTOR.

BY Robert H. Clay

ATTORNEY

Nov. 22, 1966                C. A. VOGEL                3,286,538
                      ROTATING DRIVE SYSTEM MEMBER
Filed Sept. 21, 1964                                4 Sheets-Sheet 2

CHARLES A. VOGEL
        INVENTOR.

BY Robert H. Clay

ATTORNEY

Nov. 22, 1966  C. A. VOGEL  3,286,538
ROTATING DRIVE SYSTEM MEMBER
Filed Sept. 21, 1964  4 Sheets-Sheet 3
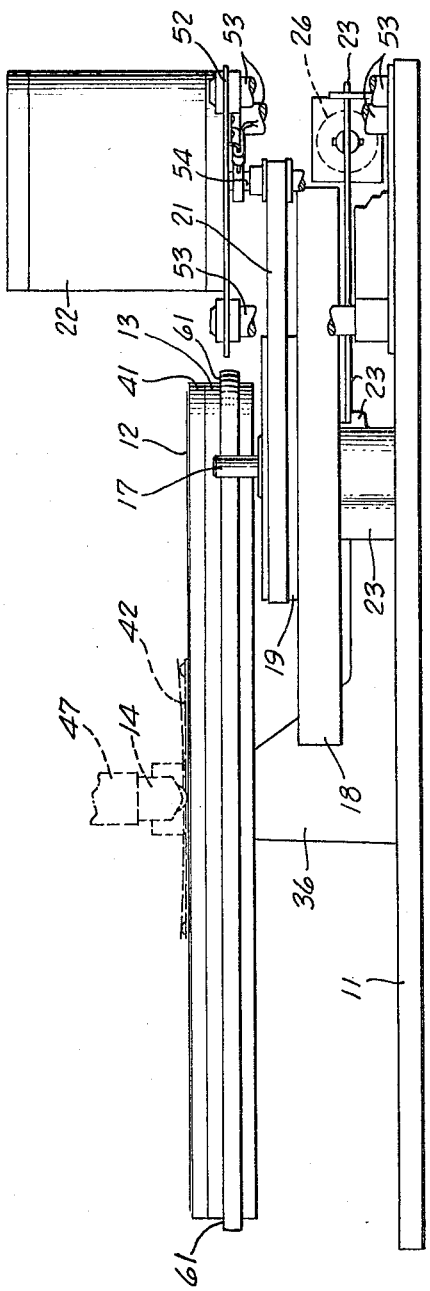
CHARLES A. VOGEL
INVENTOR.
BY Robert H. Clay
ATTORNEY Nov. 22, 1966 C. A. VOGEL 3,286,538
ROTATING DRIVE SYSTEM MEMBER
Filed Sept. 21, 1964 4 Sheets-Sheet 4
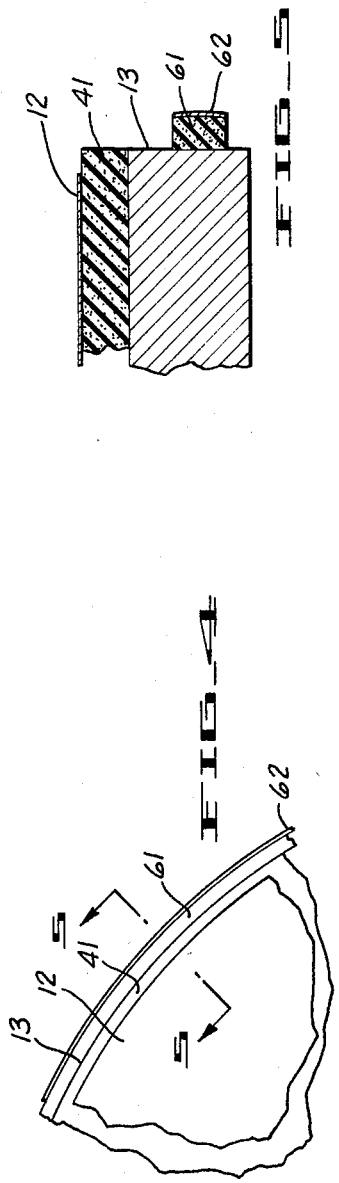
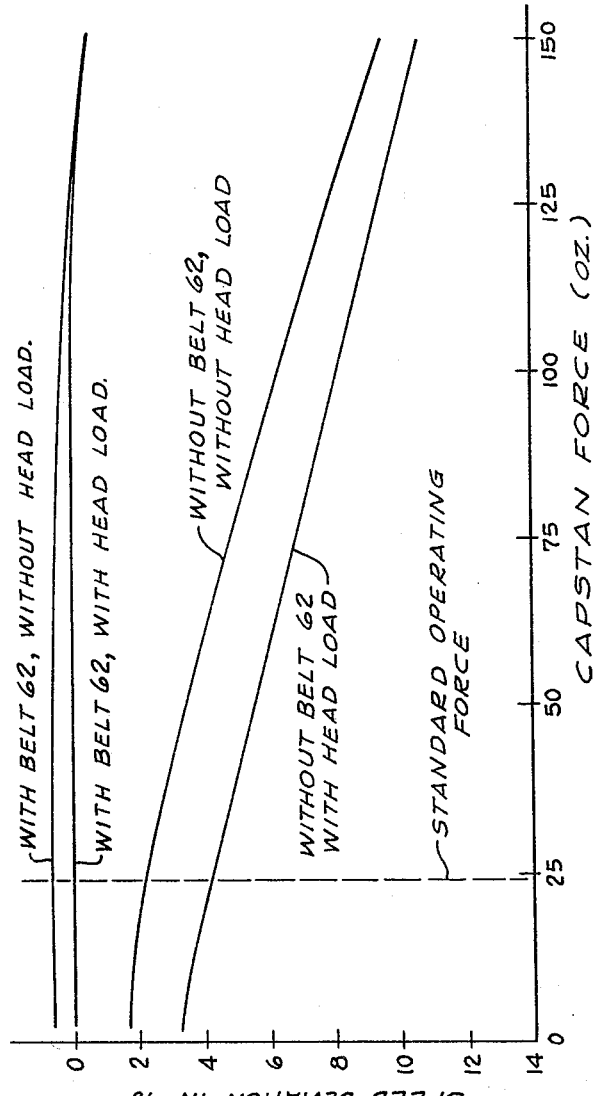
CHARLES A. VOGEL
INVENTOR.
BY Robert S. Clay
ATTORNEY United States Patent Office
3,286,538
Patented Nov. 22, 1966

3,286,538
ROTATING DRIVE SYSTEM MEMBER
Charles A. Vogel, Sunnyvale, Calif., assignor to Ampex Corporation, Redwood City, Calif., a corporation of California
Filed Sept. 21, 1964, Ser. No. 397,926
3 Claims. (Cl. 74—215)

This invention relates to rotating drive systems, and particularly to peripherally-engageable rotating members of such systems.

In drive systems in which a rotating member drives or is driven by another member in peripheral engagement therewith, it has often been proposed to provide one of the rotating members with a compliant or resilient rim or "tire" made of rubber, for example. Such arrangements have been adopted at times for various purposes. When it is desired to manufacture the system inexpensively and without rigorous tolerances, the provision of a resilient rim allows a measure of freedom in the spacing of the rotational axes and dimensions of the rotating members. In such systems, the hard-surfaced member penetrates more or less deeply into the resilient rim of the other member, but intimate frictional driving engagement is assured under all circumstances. The arrangement is also useful for accommodating the intrusion of dust particles between the engaged surfaces without damage or speed disturbances.

When such resilient-rimmed members are used in systems requiring precise output speed control, however, certain difficulties arise. For one the output speed is a function of the degree of penetration made by the hard-surfaced member into the rubber tire. Consequently, in systems in which the rubber tire is used to permit loose tolerances, the output speed cannot be established precisely at a desired value.

A second difficulty is that, no matter what average output speed is attained, this speed is subject to transient speed variations or "flutter," caused by local variations in the density, resilience, and quality of the rubber.

To more fully explain these two difficulties, and how they are related, it is necessary first to make clear that the output speed is not, as might be expected, an inverse function of the driving radius of the rubber-tired member. For example, it might be except that when the hard-surfaced member is the driving member and has a constant speed, then the rubber-tired driven member would have a faster rotational speed the more deeply the hard-surface member bites into the rubber tire, and the smaller the driving radius of the driven member. However, the opposite is the case, and the rubber-tired member actually rotates more slowly as the penetration is increased. This phenomenon has long been known in the art: see for example "Rolling Radius of Rubber-Covered Cylinders" by H. A. Borchardt in Machine Design Magazine, April 30, 1959 and "A Review of the Quest for Constant Speed" by E. W. Kellogg, Journal SMPE, April 1937. It has also been found that when the rubber-tire member is the driving member, and a constant speed, the output speed of the hard-surfaced driven member increases as the penetration is deeper, instead of decreasing as might be expected.

The explanation generally advanced for this phenomenon is that the compressed rubber in the constricted zone of engagement must travel faster in order that the volume rate of flow of rubber through the zone be maintained, as it must. Analogy is made to the increased linear speed of water through a restricted passage. If the linear or tangential speed of the rubber is greater in the zone of compression than elsewhere, then it follows that the rubber-tired member (if it is the driven member) must rotate more slowly than it would rotate if there were barely frictional contact between the members (i.e., no penetration); or the hard-surfaced member (if it is the driven member) in contact with the faster-flowing compressed rubber, must have a greater peripheral and, therefore, rotational speed.

From another point of view, it has been noted that the penetration of the hard-surfaced member into the rubber causes a stretching of the rubber surface and an elongation of the circumference of the rubber-tired member, resulting in slower relative rotation of the rubber-tired member with respect to the hard-surfaced member.

With these explanations in mind, it becomes possible to discuss the flutter effects of local variations in the quality of the rubber.

When a body of denser or harder rubber is brought during rotation into the funnel-shaped mouth of the restricted channel defined by the zone of compression beneath the hard-surfaced member, this body or "lump" of rubber tends more effectively to resist compression and in effect hangs back momentarily and refuses to enter the channel. If the rubber-tired member is the driven member, the result is a momentary rotational slowing of this member. Eventually, with continued rotation, the softer rubber downstream and beneath the hard-surfaced member is stretched further and develops a spring force sufficient to pull the "lump" through the narrow throat of the channel. In the diverging exit of the channel, the "lump" then tends to snap forward (downstream) in an action similar to that of a toggle device passing dead-center. This snapping action causes a momentary rotational acceleration of the driven rubber-tired member. Alternating short-term decelerations and accelerations of the member thus take place as zones of harder or softer rubber pass the zone of engagement, resulting in the "flutter" noted above.

Tests made by Applicant on a rubber-tired turntable driven by a hard-surfaced capstan have shown long-term turntable speed deviations of from 2% to 10% as the engagement force was varied from near zero to 150 ounces, and flutter or short-term speed deviations averaging 0.15% with frequent peaks up to 0.4–0.6%.

Accordingly, it is an object of this invention to provide a rotating drive system member suitable for producing a constant predetermined speed without requiring rigorous manufacturing tolerances.

It is another object of this invention to provide a driven turntable of the type having a compliant rim portion for engagement with a capstan and having a predetermined output speed substantially independent of the capstan engagement pressure.

It is a further object of this invention to provide a turntable as above described in which the rotational speed is substantially constant and is independent of variations in the quality of the compliant material of the rim portion.

These and other objects are attained in a structure in which a turntable is fitted with a peneperipheral portion of compliant material, such as rubber, and a peripheral portion formed as a thin flexible band of plastic, for example, having substantially zero circumferential elongation under predetermined pressures of engagement with a capstan, so that the driving circumference of the turntable is substantially constant and speed variations are eliminated.

FIGURE 3 is an elevation, to a slightly enlarged scale, taken on the plane of lines 3—3 of FIGURE 1;

FIGURE 4 is an enlarged detail of the portion enclosed by lines 4—4 of FIGURE 1;

FIGURE 5 is a cross-section taken on the plane of lines 5–5 of FIGURE 4; and

FIGURE 6 is a chart showing some effects of the invention.

Figure 1:
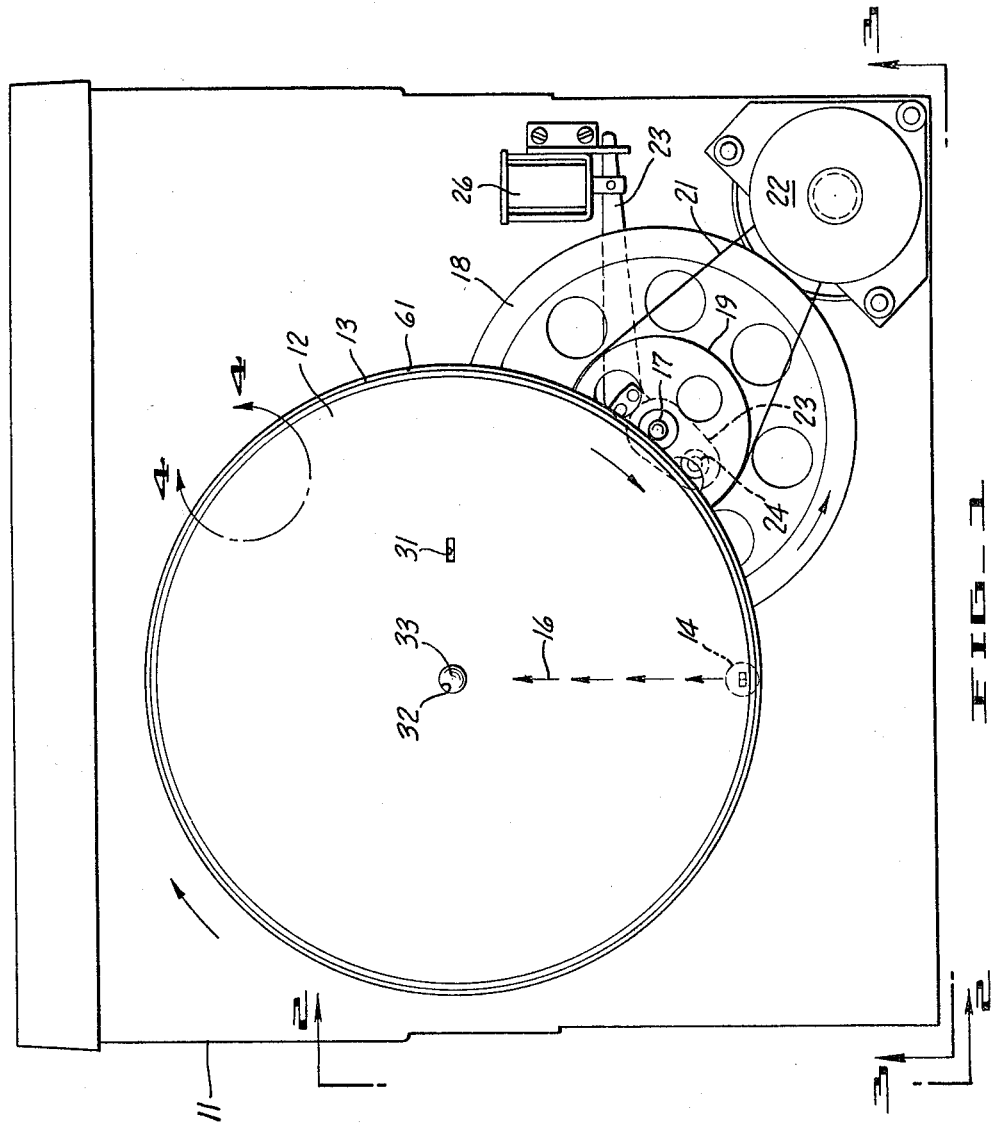
FIGURE 1 is a plan of a portion of a magnetic disc recording and reproducing machine incorporating the invention.

Referring now to FIGURE 1, there is shown a base or mounting plate 11 of a magnetic disc recording and reproducing machine substantially as described in copending application SN. 356,813 "Magnetic Recording and Reproducing Machine" by Charles A. Vogel and Erling P. Skov, filed April 2, 1964. In this machine, a plastic disc 12, formed for example of Du Pont "Mylar" polyested film, and coated with magnetic material, is mounted on a turntable 13 so as to be slowly revolved while a magnetic transducing head 14 moves radially inward along a path indicated by arrows 16, to trace a spiral path on the disc. The drive for the turntable 13 is provided by a hard surfaced capstan 17 engaging the periphery of the turntable, the capstan being an extension of a shaft on which is mounted a flywheel 18 and a pulley 19 by which the assembly is driven through a belt 21 and a motor 22.

To completely disengage the flywheel from the turntable when the unit is not in use, so as to avoid deforming the rubber rim, the capstan shaft 17 is journalled in a pivoting arm 23 so as to be retractable or engageable at will. The arm 23 pivots on a pin 24, which in turn is journalled in the base plate 11, and the arm 23 is pivoted by means of a solenoid 26, also mounted on the base-plate.

Figure 2:
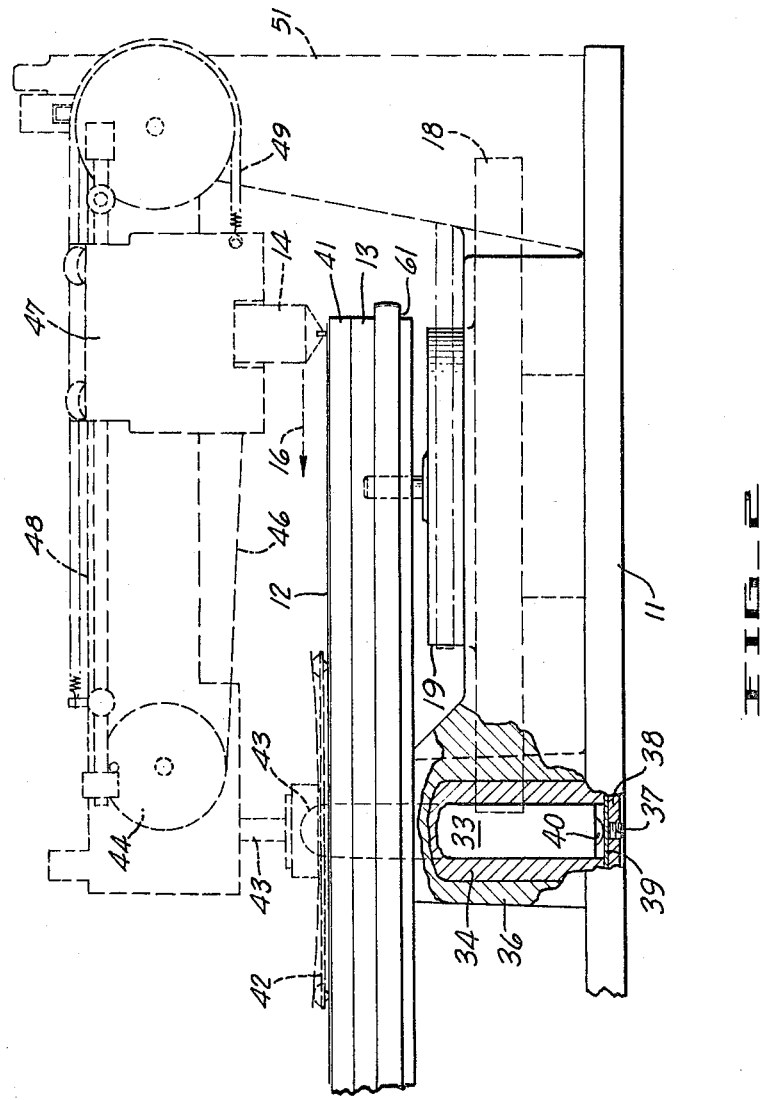
FIGURE 2 is an elevation, to a slightly enlarged scale, taken on the plane of lines 2—2 of FIGURE 1.

Further details of the structure are shown in FIGURES 2 and 3. The disc 12 has a cueing hole 31 (FIGURE 1), by which it is oriented with respect to the head 14 in a manner described in the above referenced patent application, and a central hole 32 by which it is positioned on an extension of the turntable shaft 33. The shaft is journalled in a sleeve 34 (FIGURE 2) that is in turn mounted in a boss 36 extending from the base plate 11, and the height of the turntable and the engagement pressure of the head 14 and disc 12 is adjusted by means of a set screw 37 threaded through a plate 38 affixed to the boss 36 and bearing against a flexible plate 39 upon which rests a thrust bearing ball 40 journalled in the lower end of the shaft 33. The engagement pressure of the head and disc is further determined by a resilient surface layer 41 of the turntable. A clamping plate 42 clamps the disc 12 against the turntable during recording or reproducing operation and in turn forms a clutch with the disc and turntable to drive a shaft 43 and drum 44 on which is wound a belt 46. The belt 46 draws the head 14 radially inward during operation, the head sliding in a carriage 47 along a track arm 48 against the resistance of a drum-wound spring 49. The track arm 48 is mounted for vertical sliding motion, in part on a pedestal 51, so that at the end of operation it can be raised, freeing the disc 12 for removal, and permitting the spring 49 to return the head 14 to a radially outward position. Further details of the operation of the machine for recording and reproducing may be found in the above-referenced patent application, but are not essential for an undertanding of the present invention. Further details of the motor drive system are shown in FIGURE 3, including a plate 52 and legs 53 on which the motor 22 is mounted, and motor drive shaft 54.

It will be readily understood that the effectiveness of the frictional driving contact between the turntable 13 and the capstan is a function of the force exerted by the solenoid 26, which in turn depends in part upon the position occupied by the plunger of the solenoid with respect to the coil thereof when the capstan is engaged. In order to provide uniform frictional engagement from operation to operation and from machine to machine, the tolerances of all the pivoting parts and the position of the solenoid would have to be very precisely adjusted if the turntable were provided with a hard rim. Furthermore the engagement pressure of the capstan, particularly on the impact of initial engagement, would have to be rigorously limited in order not to damage the various bearings and the smoothly finished and carefully dimensioned surfaces of the turntable and capstan, upon which speed control of the turntable depends. Also, the commonly experienced intrusion of dust particles between the capstan and turntable would cause momentary loss of engagement and slowing of the turntable, as well as damage to the surfaces. Consequently, the turntable is provided with a compliant (rubber) rim or tire 61, which makes possible the use of less expensive solenoids and other parts, having considerable variation in their dimensional and operating characteristics, eliminates the danger of pressure or impact damage to the parts, and ensures continued frictional driving even if dust particles intrude between the driving surfaces.

The use of a plain rubber tire does not entirely solve one of the problems, however. If one of the objects is to permit the use of loose tolerances in the parts, it follows that the depth of penetration of the capstan into the rubber tire must be variable within a corresponding range, for it is in this feature that the cumulative effects of tolerance deviations must be absorbed. As previously explained, however, the output speed of the turntable varies according to the depth of penetration, being slower as the penetration increases. Thus one machine might have a substantially different average turntable speed than another, and their recordings would not be interchangeable. Even a single machine might vary in speed as the dimensional adjustment of the parts changes from time to time in use or if eccentricity of the rubber rim causes variations of capstan penetration. Furthermore the short term or flutter speed variations caused by local irregularities in the hardness of the rubber, previously explained, are intolerable in a machine intended for exacting performance.

Accordingly, the present invention includes the use of an endless stabilizing band 62 tightly encompassing the tire 61, so that the tire becomes a peneperipheral (i.e., "next-to-peripheral") portion of the turntable and does not directly engage the capstan. The band 62 may be formed of either flexible material (e.g., steel) or of a plastic such as DuPont "Mylar" polyester film, and the band may be mounted with a compression fit or with adhesive. Also, the band may be formed by treating the surface layer of the rubber to form a peripheral portion that is flexible but not stretchable. An essential characteristic of the band 62 is that it must have very high tensile strength so as to be substantially immune to elongation under the range of forces applied to it by the rubber tire and the capstan in the present apparatus. The "Mylar" polyester film mentioned above, as presently manufactured and as here used, has a tensile strength of 17,000–23,700 lbs./sq. in. which is eminently suitable. Another desirable characteristic, if the band 62 is made of flexible material such as "Mylar," is that it be as thin as possible while yet having sufficient cross-sectional area to resist the tensile forces applied to it) so as to reduce to a minimum the surface or peripheral elongation that may be caused by flexing of the band in passage beneath the capstan. In the present use, "Mylar" of three mils thickness has been found quite suitable. The rubber of the turntable tire is preferably of a hardness of less than fifty durometers.

The effect of the band 62 is to provide the turntable with a substantially constant-length periphery, no matter to what depth the capstan penetrates. The rubber beneath the band 62 may still stretch and contract, and flow faster and then slower as it passes beneath the capstan, but the movement of the rubber has no effect on the speed of either belt or the turntable. Thus under all conditions the speed of the turntable remains the same. In other words, the turntable does not slow down as the capstan penetrates more deeply, and all machines have identical speeds at all times. However, the advantages of the compliant tire 61 are still preserved: a wide range of adjustment of the parts is tolerable, impact and pressure damage is avoided, and the intrusion of dust particles has substantially no effect on the speed. Furthermore, the flutter effect of variations in the hardness of the rubber is substantially eliminated. Tests on machines constructed as above described have shown short term speed variations averaging 0.05–0.08%, with low values down to 0.02% and no significant peaks.

It will be understood that the present invention may equally well be applied to driving as well as driven elements, and to rotating elements that drive or are driven by elements moving in rectilinear or other than circular paths, or to such elements when driven by hard-surfaced rotating elements, and to pulley, puck and other types of drives other than turntable drives.

FIGURE 6 shows the results of actual tests made on machines constructed as above described and using a "Mylar" band 62, both with and without the load of the transducing head 14 engaged.

Thus there has been described a structure in which a turntable is fitted with a peneperipheral portion of compliant material, such as rubber, and a peripheral portion formed as a thin flexible band of plastic, for example, having substantially zero circumferential elongation under predetermined pressures of engagement with a capstan, so that the driving circumference of the turntable is substantially constant and speed variations are eliminated.

What is claimed is:

1. In a rotating drive system, a peripherally-engageable turntable, comprising:
    a central hub member mounted for rotation;
    a peneperipheral portion mounted on said hub member and formed of compliant material; and
    a peripheral portion mounted on said peneperipheral portion and formed as a thin flexible band having substantially zero circumferential elongation under predetermined forces directed radially against said turntable.

2. In a turntable drive system including a capstan engaging the periphery of said turntable, the combination comprising:
    a turntable hub and table member mounted for rotation;
    a peneperipheral portion mounted on said hub and table member and formed of resilient material; and
    a peripheral portion mounted on said peneperipheral portion and formed as a thin flexible band having substantially zero circumferential elongation under predetermined pressures of engagement of said capstan against said turntable.

3. In a turntable drive system including a capstan engaging the periphery of said turntable, the combination comprising:
    a turntable hub and table member mounted for rotation;
    a peneperipheral portion mounted on said hub and table member and formed of rubber having a hardness of less than fifty durometers; and
    a peripheral portion mounted on said peneperipheral portion and formed as a thin flexible endless plastic band having substantially zero circumferential elongation under predetermined pressures of engagement of said capstan against said turntable.

References Cited by the Examiner

UNITED STATES PATENTS 2,276,494   3/1942   Kellogg _____ 74—215 X

FOREIGN PATENTS 1,169,375   9/1958   France.

DAVID J. WILLIAMOWSKY, *Primary Examiner.*

FRANK SUSKO, *Examiner.*

L. H. GERIN, *Assistant Examiner.*